United States Patent
Huang (10) Patent No.: US 6,543,958 B2
(45) Date of Patent: Apr. 8, 2003

(54) CONNECTION STRUCTURE FOR A GARDENING IMPLEMENT

(75) Inventor: Yao-Chung Huang, Chang Hua Hsien (TW)

(73) Assignee: Ho Cheng Garden Tools Co., Ltd., Chang Hua Hsien (TW)

(*) Notice: Subject to any disclaimer, the term of this patent is extended or adjusted under 35 U.S.C. 154(b) by 0 days.

(21) Appl. No.: 09/839,460

(22) Filed: Apr. 23, 2001

(65) Prior Publication Data

US 2002/0164196 A1 Nov. 7, 2002

(51) Int. Cl.$^7$ .................................................. F16B 7/00
(52) U.S. Cl. ...................... 403/292; 403/294; 403/301; 30/337; 30/329; 81/489
(58) Field of Search ........................... 403/322.1, 322.2, 403/292, 294, 300, 301, 316, 317, 341, 375, 321, 322.3; 16/422, 426, 427; 81/177.85, 177.1, 489; 83/698.91, 698.11; 279/71, 905; 30/337–344, 329; 172/371

(56) References Cited

U.S. PATENT DOCUMENTS

| | | | | |
|---|---|---|---|---|
| 666,511 A | * | 1/1901 | Furbish | 172/378 |
| 2,475,861 A | * | 7/1949 | Thalmann | 279/71 |
| 4,234,277 A | * | 11/1980 | Benson et al. | 408/226 |
| 5,316,323 A | * | 5/1994 | Jovanovic | 279/22 |
| 5,427,482 A | * | 6/1995 | Asano et al. | 408/240 |
| 5,454,165 A | * | 10/1995 | Thompson et al. | 30/249 |
| 5,579,848 A | * | 12/1996 | Hsu | 172/378 |
| 5,690,181 A | * | 11/1997 | Shu | 172/378 |
| 6,209,208 B1 | * | 4/2001 | Marinkovich et al. | 30/392 |
| 6,422,780 B2 | * | 7/2002 | Chen | 403/294 |
| 2001/0000833 A1 | * | 5/2001 | Chen | 30/254 |

* cited by examiner

Primary Examiner—Lynne H. Browne
Assistant Examiner—Michael P Ferguson
(74) Attorney, Agent, or Firm—Harrison & Egbert (57) ABSTRACT

A connection structure is designed to connect the blade and the handle of a gardening implement and is formed of a connection rod, a control member, a locating head, and two steel balls movably contained in the recess of the control member and the locating holes of the locating head. As the control member is rotated to locate the connection rod which is fastened to the blade, the steel balls are forced by the control member in motion into the locating holes of the locating head. The blade and the handle are separated by rotating the control member in such a manner that the steel balls are forced back into the recess of the control member.

3 Claims, 8 Drawing Sheets

CONNECTION STRUCTURE FOR A GARDENING IMPLEMENT

BACKGROUND OF THE INVENTION

1. Field of the Invention

The present invention relates generally to a gardening implement, and more particularly to a connection structure of the gardening implement.

2. Description of Related Art

Gardening implements, such as shears, spades, rakes, etc., are generally formed of a blade and a handle which is fastened at one end with the blade such that the handle is an integral part of the blade. In light of the nature of the connection structure connecting the blade and the handle, the handle is compatible with a specific blade. In other words, the handle cannot be reused along with other types of the blades.

BRIEF SUMMARY OF THE INVENTION

The primary objective of the present invention is to provide a connection structure for connecting a blade and a handle of a gardening implement. The connection structure comprises a connection rod, a control member, a locating head, and two steel balls. The steel balls are contained in the control member and the locating head before the connection structure is joined with the handle of a gardening implement.

DETAILED DESCRIPTION OF THE INVENTION

As shown in all drawings provided herewith, a connection structure 10 embodied in the present invention is designed to connect a blade 20 and a handle 30 of a gardening implement. The connection structure 10 of the present invention comprises a connection rod 11, a control member 12, a locating head 13, and two steel balls 14.

The connection rod 11 has a connector end 112 which is provided with an annular tangent slot 111 and two retaining blocks 114. The connection rod 11 is further provided in an appropriate position with a fastening hole 115.

The control member 12 is of a tubular construction and is provided in the inner wall with a recess 121 and a position confining slot 122.

The locating head 13 is provided at one end with two locating holes 131, two cuts 132, and a position confining block 133.

The two steel balls 14 are disposed in the two locating holes 131 of the locating head 13. The locating holes 131 are preferably conical in construction.

Figure 1:
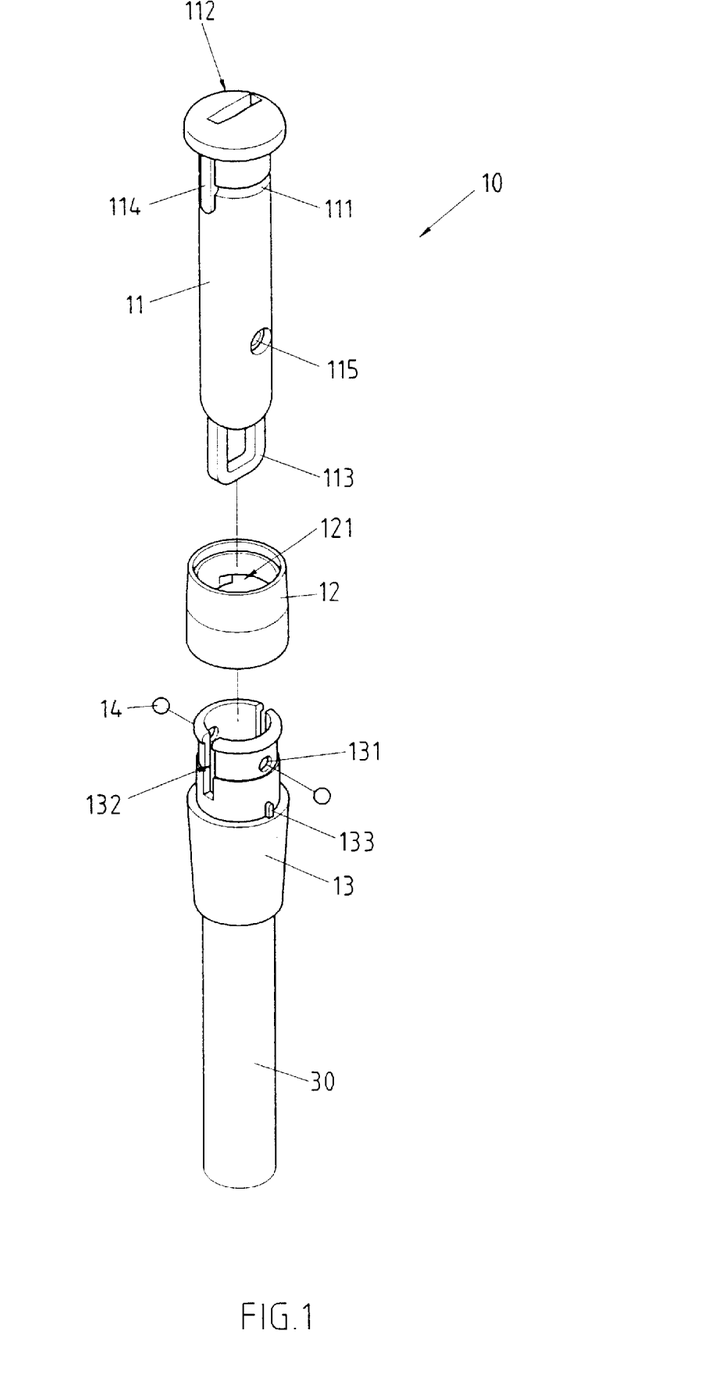
FIG. 1 shows an exploded view of the present invention.
Figure 2:
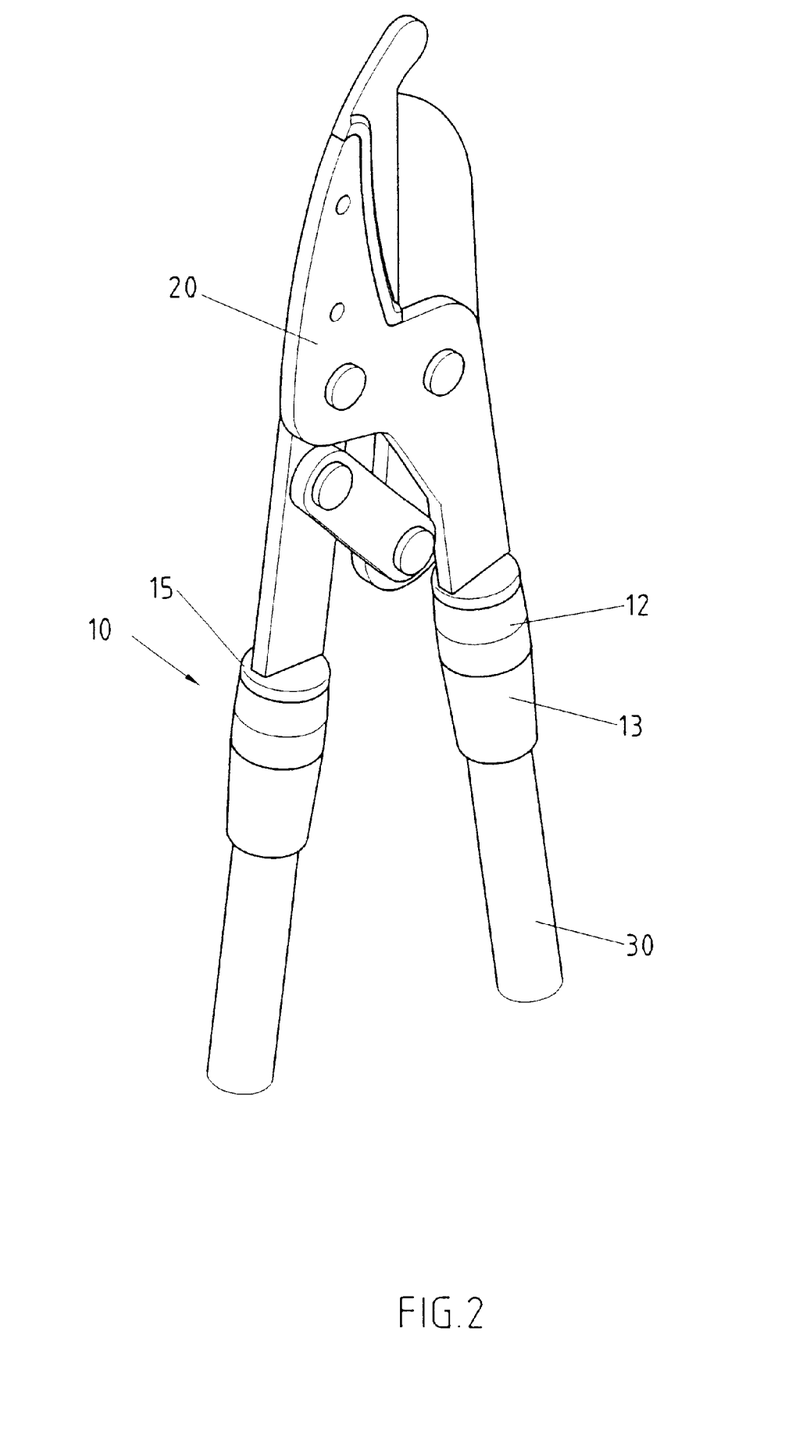
FIG. 2 shows a perspective view of the present invention in conjunction with a pair of gardening shears.
Figure 3:
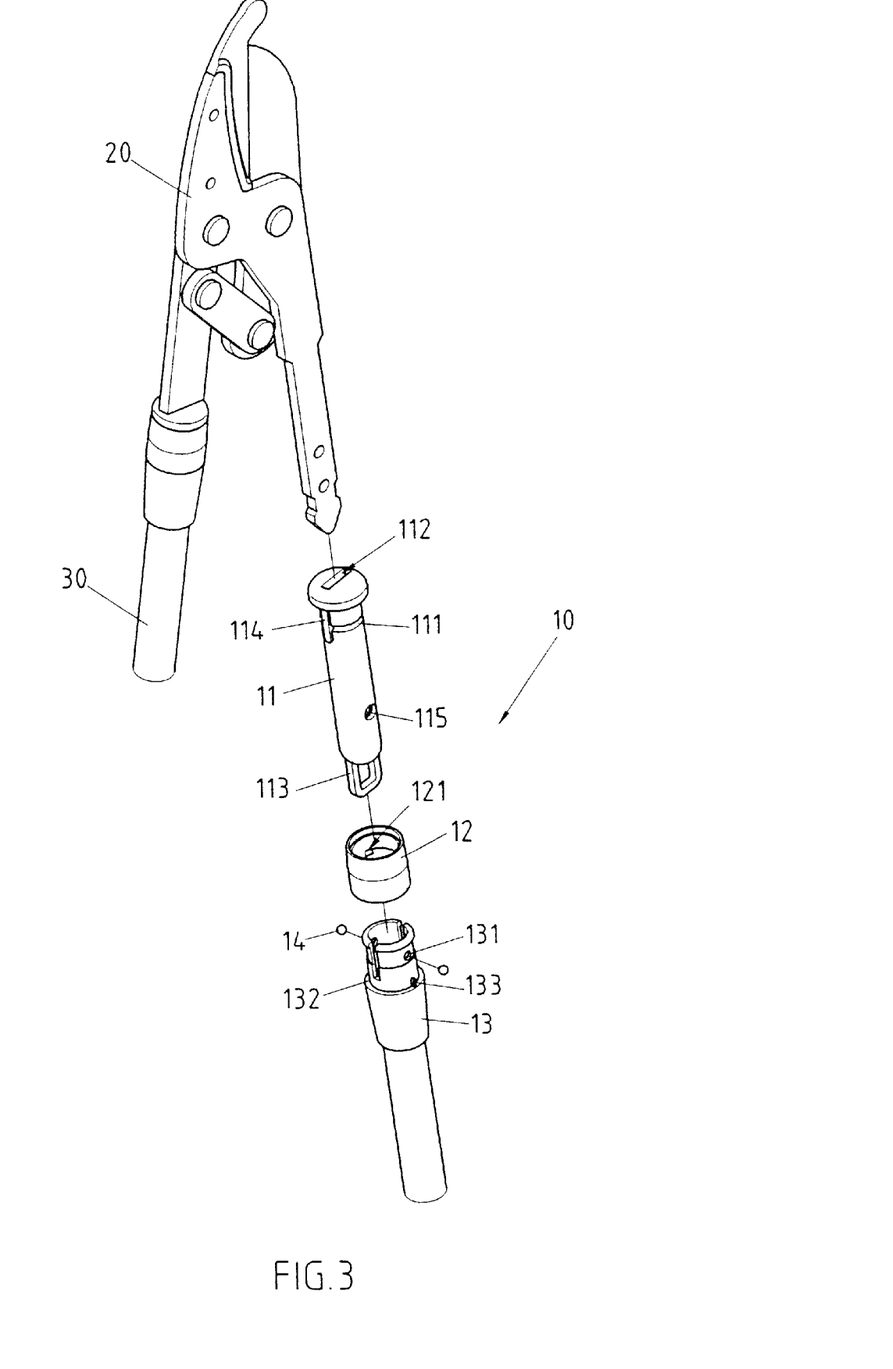
FIG. 3 shows an exploded view of the present invention as shown in FIG. 2.
Figure 4:
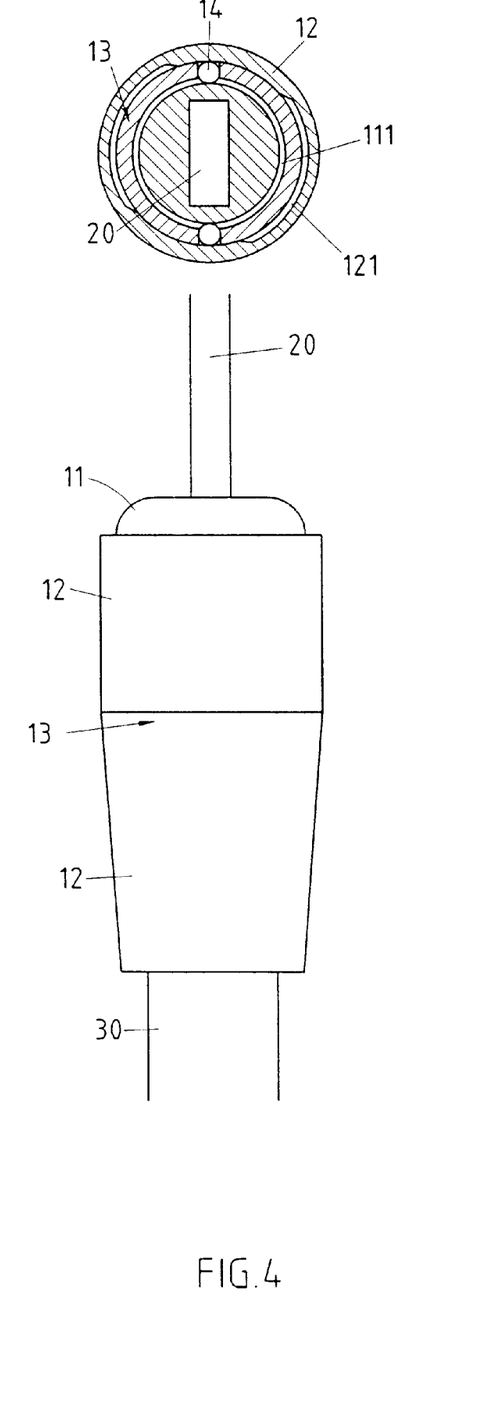
FIG. 4 shows a schematic view of the present invention in conjunction with a gardening implement.
Figure 5:
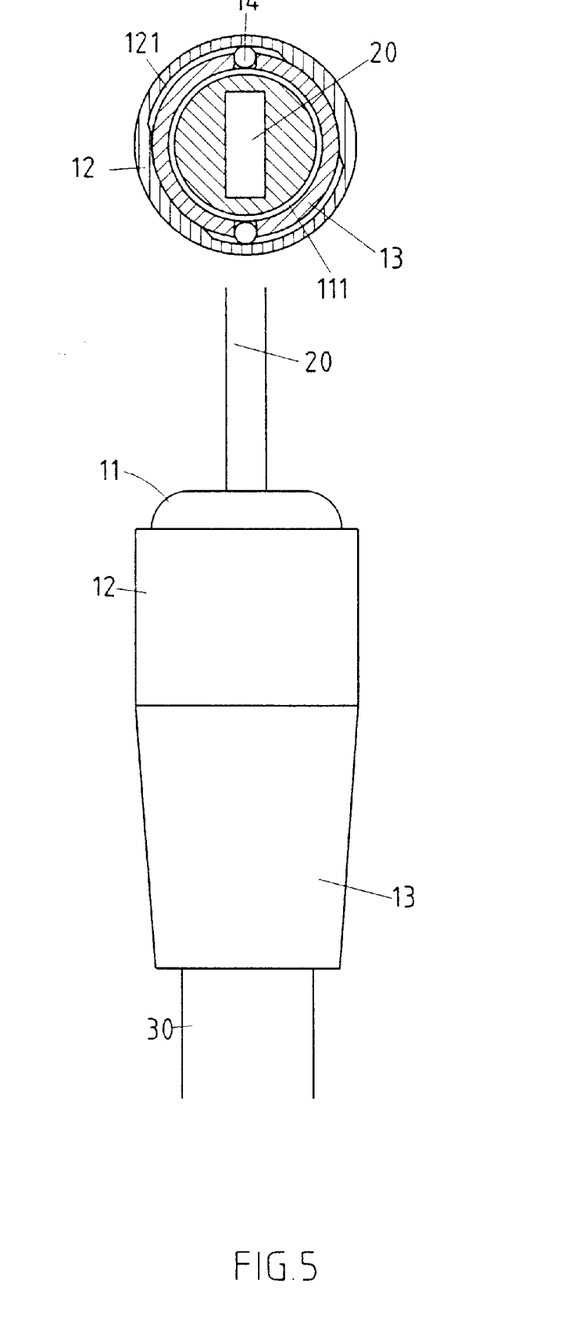
FIG. 5 shows another schematic view of the present invention in conjunction to a gardening implement.
Figure 8:
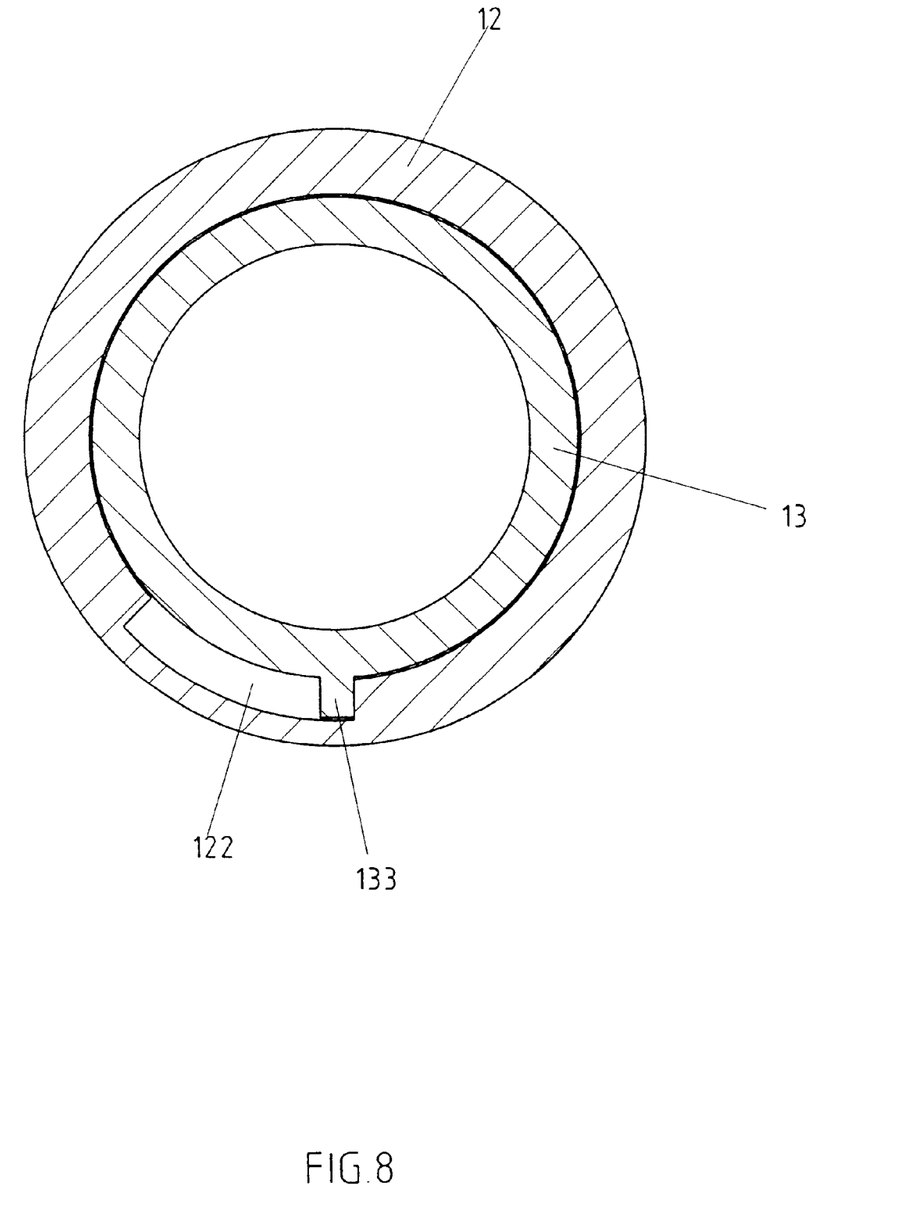
FIG. 8 shows a cross sectional view of the present invention.

The blade 20 of the gardening implement is fastened to the connection rod 11 of the connection structure 10 by a fastening screw which is engaged with the fastening hole 115 of the connection rod 11. The handle 30 of the gardening implement is fastened to the locating head 13 in conjunction with the steel balls 14 and the control member 12. The retaining blocks 114 of the connection rod 11 are retained in the cuts 132 of the locating head 13. As the control member 12 is retained, the control member 12 and the locating head 13 are confined in the spaces of the position confining block 133 and the position confining slot 122, as shown in FIG. 8. The steel balls 14 are thus forced by the control member 12 into the location holes 131 of the locating head 13, thereby locating the annular tangent slot 111 of the connection rod 11, as shown in FIG. 4. The blade 20 can be separated from the connection structure 10 of the present invention by rotating the control member 12 in such a manner that the steel balls 14 are forced back into the recess 121 of the control member 12, as shown in FIG. 5. As a result, the blade 20 and the handle 30 of the gardening implement are separated.

Figure 6:
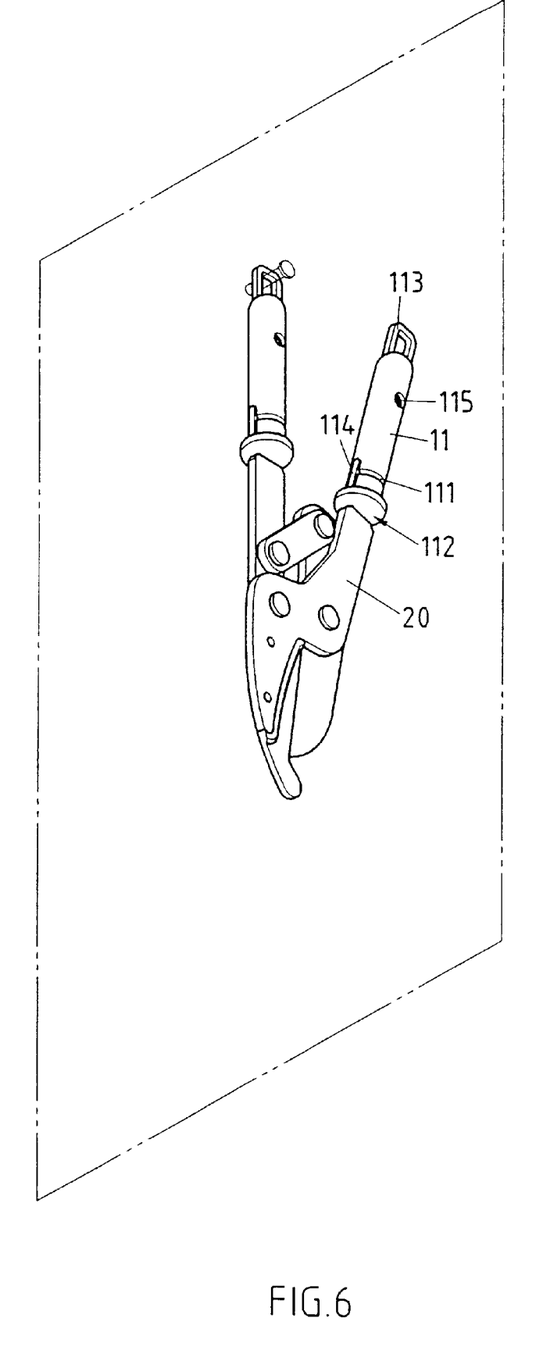
FIG. 6 shows a schematic view of the present invention enabling a gardening implement to be held on the wall.
Figure 7:
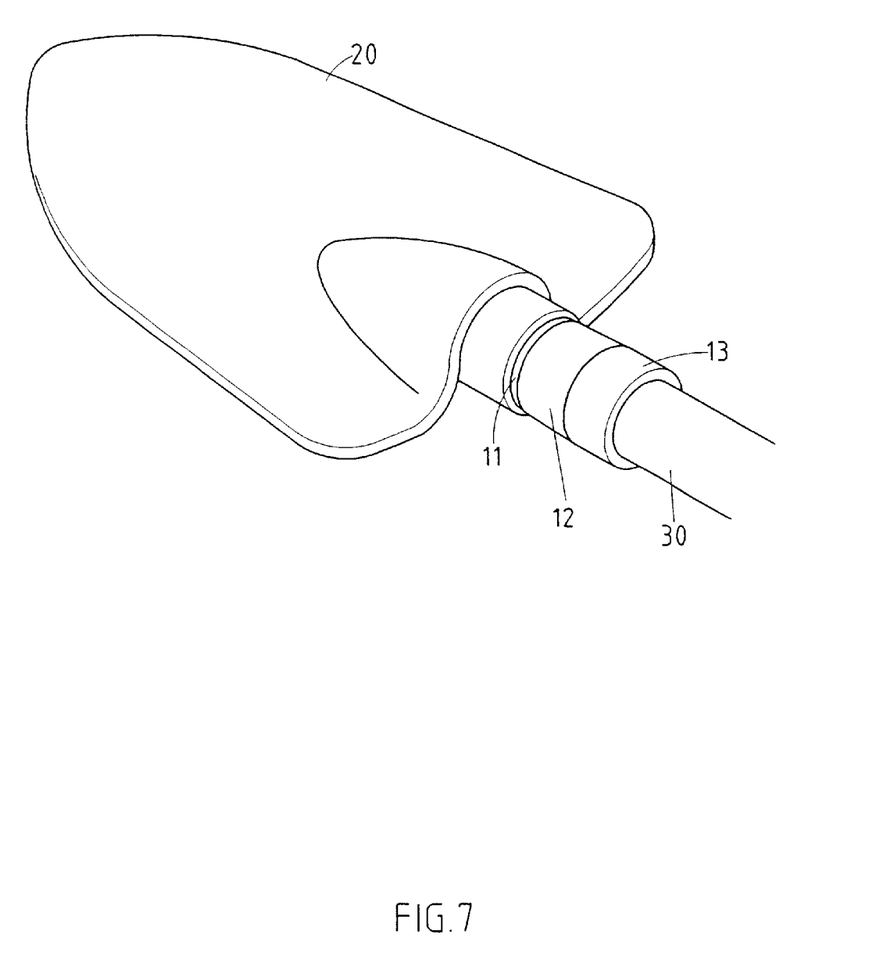
FIG. 7 shows a schematic view of the present invention in conjunction to a gardening implement.

The connection rod 11 is provided at one end with a hanger 113 opposite in location to the connector end 112 of the connection rod 11. The hanger 113 is intended to facilitate the hanging of the blade 20 for easy storage, as illustrated in FIG. 6.

The embodiment of the present invention described above is to be regarded in all respects as being merely illustrative and not restrictive. Accordingly, the present invention may be embodied in other specific forms without deviating from the spirit thereof. The present invention is therefore to be limited only by the scope of the following claims.

I claim:

1. A gardening implement comprising:

a blade;

a handle detachably connected to said blade;

a connection rod having a connector end, said connector end having an annular slot formed therein and a pair of retaining blocks adjacent to and on opposite tangential ends of said annular slot, said connection rod having a fastening hole formed through a wall thereof;

a fastening screw engaged with said fastening hole for retaining said blade in said connection rod;

a control member of tubular shape having an inner wall with a recess and a position confining slot extending circumferentially around a portion of said inner wall of said control member, said recess being an area formed so as to extend circumferentially along a portion of said inner wall of said control member;

a locating head having a pair of locating holes formed therein and a pair of slots extending longitudinally in a wall thereof and a position confining block extending outwardly therefrom, said handle being fastened to said locating head; and a pair of steel balls movably retained in said control member and said locating head, said pair of steel balls retaining said connection rod within said locating head and said control member, said retaining blocks of said connection rod being retained in said pair of slots of said locating head, said control member rotating such that said control member and said locating head are confined by said position confining block of said locating head and said position confining slot of said control member, said control member forcing said pair of steel balls into said locating holes of said locating head and said annular slot of said connection rod so as to retain said connection rod within said locating head, said control member disconnecting said handle from said blade by rotating said control member such that said pair of steel balls move back from said pair of locating holes into said recess of said control member.

2. The gardening implement of claim 1 said pair of locating holes each being of a conical configuration.

3. The gardening implement of claim 1 said connection rod having a hanger affixed to an end thereof opposite said blade.

* * * * *